Nov. 13, 1923.    J. H. WAGENHORST    1,474,183
METAL WHEEL
Filed Dec. 26, 1918    2 Sheets-Sheet 2

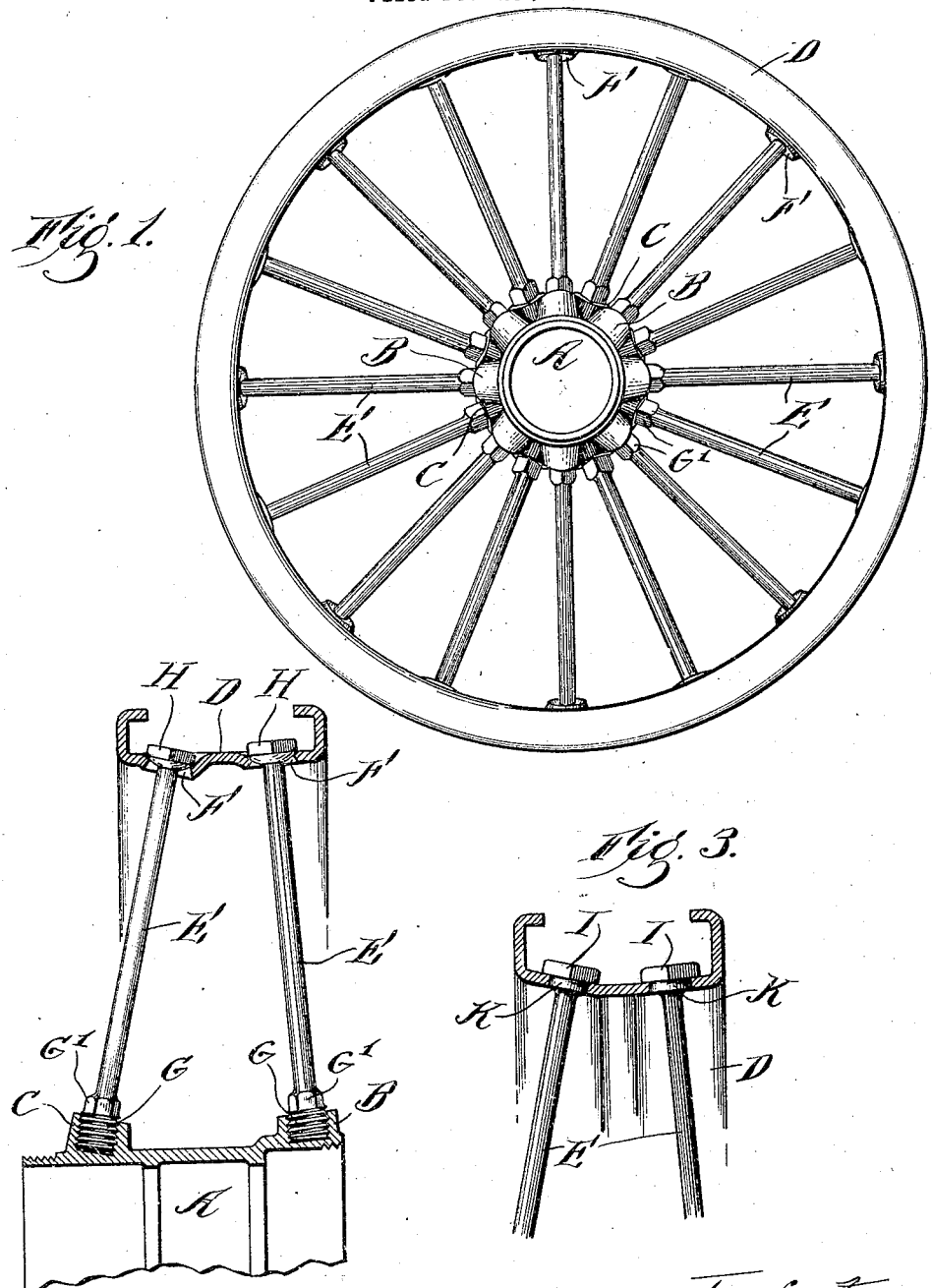

Inventor
J. H. Wagenhorst

Patented Nov. 13, 1923.

1,474,183

UNITED STATES PATENT OFFICE.

JAMES H. WAGENHORST, OF AKRON, OHIO.

METAL WHEEL.

Application filed December 26, 1918. Serial No. 268,243.

*To all whom it may concern:*

Be it known that I, JAMES H. WAGENHORST, a citizen of the United States, residing at Akron, in the county of Summit and State of Ohio, have invented a certain new and useful Improvement in Metal Wheels, of which the following is a full, clear, and exact description, reference being had to the accompanying drawings.

This invention relates generally to metal wheels and more particularly to a tensioned wheel in which the spokes are in the form of metallic rods and the felly preferably a sheet metal channeled fixed rim, the spokes being subjected to tension simultaneously with their connection to the hub.

The object of the invention is to provide an exceedingly cheap, simple and durable construction of metal wheel, one which can be quickly and easily assembled, and another object is to provide a tensioned traction wheel, in which the spokes are employed to connect the traction member to the fixed rim.

With these various objects in view the invention consists in the novel features of construction and arrangement hereinafter fully described and pointed out in the claims.

Figure 4:
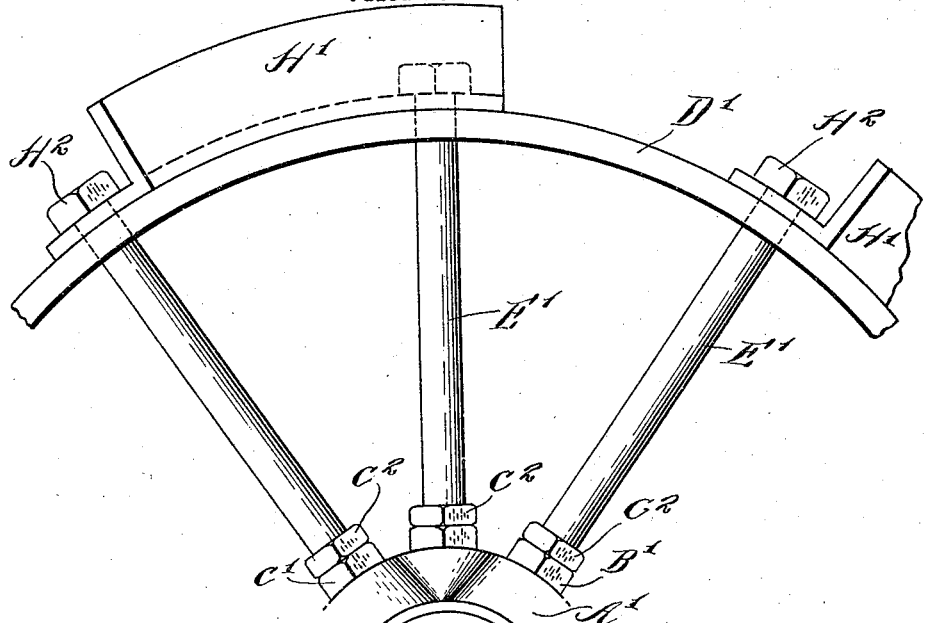
Figure 5:
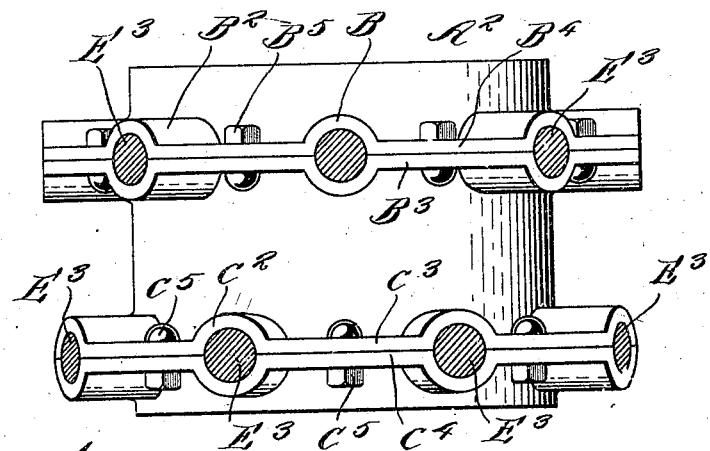

In the drawings forming a part of this specification Fig. 1 is a side elevation of a metal wheel constructed in accordance with my invention; Fig. 2 is a detail sectional view of the fixed rim and hub, the spokes being shown in elevation; Fig. 3 shows a slight modification of the fixed rim and spoke end; Fig. 4 is a view showing the application of my invention to a traction wheel, and Fig. 5 shows a modified form of hub.

In carrying out my invention I employ a hub A the exterior of which is provided with a series of bosses B, adjacent its inner end, and a series of bosses C adjacent its outer end. These bosses are given a proper inclination with reference to the longitudinal axis of the hub or the vertical axis of the wheel and are threaded internally as shown. The fixed rim D is preferably of the channeled or flanged type and is adapted to receive a demountable tire carrying rim. The spokes E are of wrought iron of suitable cross sectional area according to the loads to be carried; and in the drawings I have shown the inner series of spokes as alternating with the outer series but it will be understood that if desired the inner and outer series can be arranged in alignment with each other. The base or bottom of the fixed rim is apertured as shown at F and through which the inner ends of the spokes can be passed, the extreme inner ends being threaded as shown at G and screwed into the threaded bosses B and C and it will be noted that above the threaded portion the spokes are made hexagonal as shown at G' to facilitate turning or threading into the hub. The outer ends of the spokes are upset or headed and preferably "hexed" and these head portions are of sufficient area to bear upon the base or bottom of the fixed rim and if desired the openings in the base of the fixed rim may have their edges turned so as to have the heads of the spokes bear properly thereon when the spoke is brought into engagement with the threaded boss, and in this manner the inclination of the spoke can be compensated for and the proper bearing provided between the outer end of the spoke and the fixed rim. In this manner any desired inclination can be given to the spoke and compensated for in the bearing portion of the fixed rim. This construction is most clearly shown in Fig. 2.

In Fig. 3 I have shown the base of the felly as angled to correspond with the angles of inclination of the inner and outer series of spokes and the heads I of the spokes are somewhat enlarged, and directly beneath them there are the shoulders K which are of a size to fit snugly into the openings in the fixed rim. The heads H and I of the spokes can be made hexagonal or round as preferred and after the spokes are inserted and threaded into the bosses B and C the tensioning can me accomplished either by applying a wrench to the head of the spoke or to the shoulders G' or to both.

In Fig. 4 I have shown the aplication of my invention to a traction wheel and in which A' is the hub, D' the fixed rim and E' the spokes. The hub is formed with threaded bosses B' and C' into which the ends of the spokes are threaded and lock or jam nuts $G^2$ may be employed to secure the same. H' indicate traction shoes or members flanged or angled in form and applied to the exterior of the fixed rim as shown and the spokes are passed through the base flanges of these traction members or shoes at the same time they are passed through the fixed rim and the heads $H^2$ of said spokes contact with the flanges or base portions of the traction members or shoes and hold them securely to the fixed rim. This construction provides an exceedingly simple and durable construction of tensioned traction wheel.

In Fig. 4 I have shown a slight modification of hub $A^2$ in which the bosses $B^2$ and $C^2$ are united by webs $B^3$ and $C^3$ respectively and these webs are divided or cut centrally as indicated at $B^4$ and $C^4$ respectively, providing split sockets into which the ends of the spokes $E^3$ are inserted and then by means of clamping bolts and nuts $B^5$ and $C^5$ respectively these split sockets can be securely clamped together and the spoke ends held against rotation.

Having thus described my invention what I claim is:—

1. A metal wheel comprising a hub, a channeled fixed rim and a plurality of spokes, said hub having a plurality of threaded sockets, the inner ends of said spokes being threaded and engaging said hub sockets, the outer ends of the spokes being headed and adapted to engage the base of said fixed rim, said spokes being inclined with reference to the central tread plane of the wheel, said spoke heads and base of fixed rim being shaped to contact and compensate for the inclination of said spokes.

2. A metal wheel comprising a hub, a channeled fixed rim, and spokes, said hub having threaded sockets, the inner end of said spokes being threaded and engaging said sockets, the outer ends of said spokes being headed and shaped for engagement by a wrench, said spokes being arranged at an inclination to the central tread plane of the wheel, the base portions of the fixed rim adjacent the heads of spokes being angled to correspond with the inclination of the spoke.

3. In a wheel a hub having a plurality of threaded sockets adapted to receive the threaded ends of spokes, said threaded sockets being connected by means of divided webs, and clamping means applied to said webs for contracting said sockets as set forth.

In testimony whereof, I hereunto affix my signature.

JAMES H. WAGENHORST.